(12) United States Patent
Ellul et al.

(10) Patent No.: US 10,414,914 B2
(45) Date of Patent: Sep. 17, 2019

(54) DYNAMICALLY VULCANIZED ALLOYS

(71) Applicant: ExxonMobil Chemical Patents Inc., Baytown, TX (US)

(72) Inventors: Maria D. Ellul, Silver Lake Village, OH (US); Rodney May, Jr., Friendswood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 72 days.

(21) Appl. No.: 15/500,979

(22) PCT Filed: Aug. 14, 2015

(86) PCT No.: PCT/US2015/045312
§ 371 (c)(1),
(2) Date: Feb. 1, 2017

(87) PCT Pub. No.: WO2016/053485
PCT Pub. Date: Apr. 7, 2016

(65) Prior Publication Data
US 2017/0218190 A1    Aug. 3, 2017

Related U.S. Application Data

(60) Provisional application No. 62/058,983, filed on Oct. 2, 2014.

(51) Int. Cl.
| | |
|---|---|
| *C08L 23/28* | (2006.01) |
| *B60C 1/00* | (2006.01) |
| *C08K 3/34* | (2006.01) |
| *C08L 23/08* | (2006.01) |
| *C08L 77/00* | (2006.01) |
| *B82Y 30/00* | (2011.01) |

(52) U.S. Cl.
CPC .......... *C08L 23/283* (2013.01); *B60C 1/0008* (2013.01); *C08K 3/346* (2013.01); *C08L 23/0861* (2013.01); *C08L 77/00* (2013.01); *B82Y 30/00* (2013.01); *C08L 2201/14* (2013.01); *C08L 2205/03* (2013.01); *C08L 2205/22* (2013.01)

(58) Field of Classification Search
CPC ..... C08L 23/283; C08L 23/0861; C08L 77/00
See application file for complete search history.

(56) References Cited

U.S. PATENT DOCUMENTS

| | | | |
|---|---|---|---|
| 7,491,764 B2 | 2/2009 | Dias et al. | |
| 8,039,526 B2 * | 10/2011 | Ellul | C08L 23/16 501/145 |
| 2010/0036023 A1 * | 2/2010 | Weng | B60C 1/0008 524/13 |
| 2011/0060082 A1 * | 3/2011 | Sugimoto | C08L 53/00 524/262 |
| 2011/0152422 A1 * | 6/2011 | Rodgers | B82Y 30/00 524/258 |
| 2011/0265927 A1 | 11/2011 | Weng et al. | |
| 2012/0035325 A1 * | 2/2012 | Ellul | C08L 23/283 525/196 |
| 2013/0156982 A1 | 6/2013 | Kawaguchi et al. | |

FOREIGN PATENT DOCUMENTS

| | | |
|---|---|---|
| WO | 02/100923 A | 12/2002 |
| WO | 2007050071 | 5/2007 |
| WO | 2010016976 | 2/2010 |

* cited by examiner

Primary Examiner — Peter D. Mulcahy (57) ABSTRACT

This invention relates to the preparation of a dynamically vulcanized alloy comprising at least one elastomer, at least one thermoplastic resin, a nanofiller, and an ethylene copolymer resin.

17 Claims, 4 Drawing Sheets

DYNAMICALLY VULCANIZED ALLOYS

PRIORITY CLAIM TO RELATED APPLICATIONS

This present application is a National Stage Application of International Application No. PCT/US2015/045312 filed Aug. 14, 2015, which claims the benefit of and priority to U.S. Provisional Application Ser. No. 62/058,983 filed Oct. 2, 2014, the disclosures of which are fully incorporated herein by their references.

FIELD OF THE INVENTION

The present invention relates generally to dynamically vulcanized alloys of elastomer and thermoplastic resins. More specifically, the present invention relates to dynamically vulcanized alloys containing nanofillers.

BACKGROUND OF THE INVENTION

Various types of thermoplastic elastomer compositions containing elastomers, both cured and uncured, and thermoplastic resins are known in the industry. A cured elastomer composition is known as either thermoplastic plastic vulcanizates (TPVs) or as dynamically vulcanized alloys (DVAs). The elastomer in TPVs is dispersed in the thermoplastic resin, providing flexibility to the material due to the elastomer and reprocessability due to the thermoplastic resin. These materials are known to be useful in a variety of applications including automotive parts, such as bumpers, knobs, and trim, electrical and applications, such as cable jacketing and connectors, and industrial applications, such as piping, o-rings, sleeves, extruded spiral hoses, and weather stripping. For all of these known applications, the TPVs or DVAs are cast, blown, or molded to form the final products.

The conventional fabrication process is a multiple-step process having the following steps. The compound is produced by (i) preparing a rubber master batch by mixing, at temperatures below the cross-linking temperature, the elastomer and curative until a uniform mix state is obtained (this is often referred to as pre-conditioning) and (ii) premixing a resin master batch comprising a thermoplastic resin and plasticizers. If desired, conventional fillers and other processing aids may also be added to the rubber master batch. A thermoplastic resin masterbatch is mixed typically in a twin screw extruder by mixing the resin and plasticizers. The resin masterbatch may then be pelletized. The rubber master batch, resin master batch, and all remaining components are then fed into a mixer, as well as any desired secondary components, and mixed at high temperatures under shear conditions. The elastomer component is vulcanized during the melt mixing.

DVAs compounded for low permeability [or stated alternatively: high impermeability] applications comprise low-permeability thermoplastic resin, such as polyamide or a blend of polyamides, in which there is dispersed a low-permeability rubber. Such low permeability rubbers include butyl rubber, halobutyl rubbers, or brominated isobutylene para-methylstyrene copolymers. The rubber is cured under conditions of dynamic vulcanization (curing the rubber during melt mixing as opposed to static curing that typically occurs in a rubber mold) and is intimately and uniformly dispersed as a particulate phase within a continuous phase of the thermoplastic resin. In an embodiment, a co-continuous morphology may also be formed. For low permeability applications, it is desired to achieve a composition having sub-micron size dispersed rubber particles. This dispersed cross-linked particle assists the material in having elastic properties.

The elastic nature is desirable for applications requiring flexibility, strength, and elongation. Such properties are also desirable in tire materials. Thus, in recent years, the use of DVAs as tire inner liner layers has been explored. The thermoplastic resin provides a very low permeability to the inner liner layer while the elastomer provides flexibility and durability to the inner liner layer. Accordingly, the inner liner layer formed from DVA can be formed as a very thin layer. Conventional inner liner layers, comprised of only a base elastomer(s), typically have a thickness or gauge in the range of 1.25 to 7.0 mm while inner liner layers formed from DVA have typically a thickness range of 0.08 mm to 0.25 mm.

U.S. Pat. No. 7,491,764 discloses a nanocomposite composition having a nanofiller, an elastomeric matrix, and one or more exfoliating additives. U.S. Pat. No. 8,039,526 discloses a method for preparing a nanofiller-filed TPV. However, the past work of Applicants and others in using DVA for tire innerliners has highlighted the need for continued improvement in impermeability of the DVAs.

SUMMARY OF THE INVENTION

The present invention is directed to a DVA/TPV composition comprising a thermoplastic resin and an elastomer. Preferably the elastomer is a low-permeability rubber.

The present invention is directed to a dynamically vulcanized alloy, the alloy comprising at least one elastomer comprising $C_4$ to $C_7$ isomonoolefin derived units; at least one thermoplastic resin having a melting temperature in the range of 170° C. to 260° C.; a nanofiller; and 5 to 30 phr of an ethylene copolymer resin, wherein the elastomer is present as a dispersed phase of small particles in a continuous phase of the thermoplastic resin.

These and other features, aspects, and advantages of the present invention will become better understood with regard to the following description and appended claims.

DETAILED DESCRIPTION OF THE INVENTION

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the polymerized form of a derivative from the monomer (i.e., a monomeric unit). However, for ease of reference the phrase comprising the (respective) monomer or the like is used as shorthand.

Elastomer refers to any polymer or composition of polymers consistent with the ASTM D1566 definition: "a material that is capable of recovering from large deformations, and can be, or already is, modified to a state in which it is essentially insoluble, if vulcanized, (but can swell) in a solvent." In the present invention, elastomers may be referred to as polymers, elastomeric polymers, or rubbers; the term elastomer may be used herein interchangeably with the term rubber or polymer.

The term "phr" is parts per hundred rubber or "parts", and is a measure common in the art wherein components of a composition are measured relative to a total of all of the elastomer components. The total phr or parts for all rubber components, whether one, two, three, or more different rubber components is present in a given recipe is normally defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percentages for every component after adjusting levels of only one, or more, component(s).

The terms "vulcanized" or "cured" refers to the chemical reaction that forms bonds or cross-links between the polymer chains of an elastomer.

The term "dynamic vulcanization" is used herein to connote a vulcanization process in which a vulcanizable elastomer, present with a thermoplastic resin, is vulcanized under conditions of high shear. As a result of the shear mixing, the vulcanizable elastomer is simultaneously cross-linked and dispersed as fine particles of a "micro gel" within the thermoplastic resin, creating a dynamically vulcanized alloy ("DVA"). The unique characteristic of the DVA is that, notwithstanding the fact that the elastomer component may be fully or partially cured, the DVA can be processed and reprocessed by conventional rubber processing techniques such as extrusion, injection molding, compression molding, etc. Scrap or flashing can be salvaged and reprocessed.

The terms "downstream" and "upstream" when discussing a process or an extruder are given conventional terms in the art. When referencing something as 'downstream' in the process or extruder, it means a point in time or location in the process or extruder that is after the referenced point. When referencing something as 'upstream' in the process or extruder, it means a point in time or location in the process or extruder that is before the referenced point. For example, if B is introduced downstream of A, then B is introduced into the process or extruder after A and conversely if B is introduced upstream of A, then it is introduced before A.

The DVA has a desired morphology wherein the elastomer is uniformly dispersed as fine particles within the thermoplastic resin. The thermoplastic resin component forms the continuous phase and the elastomer is the dispersed phase even where the rubber to resin ratio is 1.0 or more. The dispersed particle size of the elastomer and the structure of the resin phase are controlled to improve the durability of the DVA, in particular durability at low temperatures.

Elastomers

The elastomeric component of the DVA may be selected from an assortment of thermosetting, elastomeric materials. For uses where impermeability of the final article to be produced is desired, the use of at least one low-permeability elastomer is desired.

Useful for this invention are elastomers derived from a mixture of monomers, the mixture having at least the following monomers: a $C_4$ to $C_7$ isoolefin monomer and a polymerizable monomer. In such mixtures, the isoolefin is present in a range from 70 to 99.5 wt % of the total monomers in any embodiment, or 85 to 99.5 wt % in any embodiment. The polymerizable monomer is present in amounts in the range of from 30 to about 0.5 wt % in any embodiment, or from 15 to 0.5 wt % in any embodiment, or from 8 to 0.5 wt % in any embodiment. The elastomer will contain monomer derived unit amounts having the same weight percentages.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The polymerizable monomer may be a C4 to C14 multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene, alkylstyrene, e.g., p-methylstyrene, and dichlorostyrene are also suitable for preparing a useful elastomer.

Preferred elastomers useful in the practice of this invention include isobutylene-based copolymers. An isobutylene based elastomer or a polymer refers to an elastomer or a polymer comprising at least 70 mol % repeat units from isobutylene and at least one other polymerizable unit. The isobutylene-based copolymer may or may not be halogenated. In an embodiment, ionomer versions of these polyisobutylene polymers may also be used as the elastomeric component of the invention.

In any embodiment of the invention, the elastomer may be a butyl-type rubber or branched butyl-type rubber, especially halogenated versions of these elastomers. Useful elastomers are unsaturated butyl rubbers such copolymers of olefins or isoolefins and multiolefins. Non-limiting examples of unsaturated elastomers useful in the method and composition of the present invention are poly(isobutylene-co-isoprene), polyisoprene, polybutadiene, polyisobutylene, poly(styrene-co-butadiene), natural rubber, star-branched butyl rubber, and mixtures thereof. Useful elastomers in the present invention can be made by any suitable means known in the art, and the invention is not herein limited by the method of producing the elastomer. Butyl rubber is obtained by reacting isobutylene with 0.5 to 8 wt % isoprene, or reacting isobutylene with 0.5 wt % to 5.0 wt % isoprene—the remaining weight percent of the polymer being derived from isobutylene; the butyl rubber contains monomer derived unit amounts having the same weight percentages.

Elastomeric compositions of the present invention may also comprise at least one random copolymer comprising a $C_4$ to $C_7$ isoolefin and an alkylstyrene comonomer. The isoolefin may be selected from any of the above listed $C_4$ to $C_7$ isoolefin monomers, and is preferably an isomonoolefin, and in any embodiment may be isobutylene. The alkylstyrene may be para-methylstyrene, containing at least 80%, more alternatively at least 90% by weight of the para-isomer. The random copolymer may optionally include functionalized interpolymers. The functionalized interpolymers have at least one or more of the alkyl substituents groups present in the styrene monomer units; the substituent group may be a benzylic halogen or some other functional group. In any embodiment, the polymer may be a random elastomeric copolymer of a $C_4$ to $C_7$ α-olefin and an alkylstyrene comonomer. The alkylstyrene comonomer may be para-methylstyrene containing at least 80%, alternatively at least 90% by weight, of the para-isomer. The random comonomer may optionally include functionalized interpolymers wherein at least one or more of the alkyl substituents groups present in the styrene monomer units contain a halogen or some other functional group; up to 60 mol % of the para-substituted styrene present in the random polymer structure may be the functionalized. Alternatively, in any embodiment, from 0.1 to 5 mol % or 0.2 to 3 mol % of the para-substituted styrene present may be the functionalized.

The functional group may be halogen or some other functional group which may be incorporated by nucleophilic substitution of any benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. In any embodiment, the elastomer comprises random polymers of isobutylene and 0.5 to 20 mol % para-methylstyrene wherein up to 60 mol % of the methyl substituent groups present on the benzyl ring is functionalized with a halogen such a bromine or chlorine, an acid, or an ester.

In any embodiment, the functionality on the elastomer is selected such that it can react or form polar bonds with functional groups present in the thermoplastic resin, for example, acid, amino or hydroxyl functional groups, when the DVA components are mixed at reactive temperatures.

Brominated poly(isobutylene-co-p-methylstyrene) "BIMSM" polymers useful in the present invention generally contain from 0.1 to 5 mol % of bromomethylstyrene groups relative to the total amount of monomer derived units in the copolymer. In any embodiment of the invention using BIMSM, the amount of bromomethyl groups is from 0.5 to 3.0 mol %, or from 0.3 to 2.8 mol %, or from 0.4 to 2.5 mol %, or from 0.5 to 2.0 mol %, wherein a desirable range for the present invention may be any combination of any upper limit with any lower limit. Also in accordance with the invention, the BIMSM polymer has either 1.0 to 2.0 mol % bromomethyl groups, or 1.0 to 1.5 mol % of bromomethyl groups. Expressed another way, exemplary BIMSM polymers useful in the present invention contain from 0.2 to 10 wt % of bromine, based on the weight of the polymer, or from 0.4 to 6 wt % bromine, or from 0.6 to 5.6 wt %. Useful BIMSM polymers may be substantially free of ring halogen or halogen in the polymer backbone chain. In any embodiment, the random polymer is a polymer of $C_4$ to $C_7$ isoolefin derived units (or isomonoolefin), para-methylstyrene derived units and para-(halomethylstyrene) derived units, wherein the para-(halomethylstyrene) units are present in the polymer from 0.5 to 2.0 mol % based on the total number of para-methylstyrene, and wherein the para-methylstyrene derived units are present from 5 to 15 wt %, or 7 to 12 wt %, based on the total weight of the polymer. In any embodiment, the para-(halomethylstyrene) is para-(bromomethylstyrene).

Other suitable low-permeability elastomers are isobutylene containing elastomers such as isobutylene-isoprene-alkylstyrene terpolymers or halogenated isobutylene-isoprene-alkylstyrene terpolymers wherein for each of these terpolymers, the isobutylene derived component in the terpolymer is 70 to 99 wt % of the monomer units in the polymer, the isoprene derived component is 29 to 0.5 wt % of the monomer units in the polymer, and the alkylstyrene derived component is 29 to 0.5 wt % of the monomer units in the polymer.

Suitable $C_4$ to $C_7$ isoolefin derived elastomers (including the brominated isobutylene-paramethylstyrene copolymers) having a number average molecular weight Mn of at least about 25,000, preferably at least about 50,000, preferably at least about 75,000, preferably at least about 100,000, preferably at least about 150,000. The polymers may also have a ratio of weight average molecular weight (Mw) to number average molecular weight (Mn), i.e., Mw/Mn of less than about 6, preferably less than about 4, more preferably less than about 2.5, most preferably less than about 2.0. In another embodiment, suitable halogenated isobutylene elastomer components include copolymers (such as brominated isobutylene-paramethylstyrene copolymers) having a Mooney viscosity (1+4) at 125° C. (as measured by ASTM D 1646-99) of 30 or more, or more preferably 40 or more.

Preferred elastomers include copolymers of isobutylene and para-alkylstyrene, which may or may not be halogenated. Preferably the copolymer of isobutylene and para-alkylstyrene is halogenated. Such elastomers are described in EP 0 344 021. The copolymers preferably have a substantially homogeneous compositional distribution. Preferred alkyl groups for the para-alkylstyrene moiety include alkyl groups having from 1 to 5 carbon atoms, primary haloalkyl, secondary haloalkyl having from 1 to 5 carbon atoms and mixtures thereof. A preferred copolymer comprises isobutylene and para-methylstyrene. In any embodiment, brominated copolymers of isobutylene and para-methylstyrene include those having 5 to 12 weight % para-methylstyrene, 0.3 to 1.8 mol % brominated para-methylstyrene, and a Mooney viscosity of 30 to 65 (1+4) at 125° C. (as measured by ASTM D 1646-99). In any embodiment, the brominated copolymers of isobutylene and para-methylstyrene include those having 7 to 12 weight % para-methylstyrene, 0.75 to 1.5 mol % brominated para-methylstyrene, and a Mooney viscosity of 30 to 45 (1+4) at 125° C. (as measured by ASTM D 1646-99).

Thermoplastic Resin

For purposes of the present invention, a thermoplastic (alternatively referred to as thermoplastic resin) is a thermoplastic polymer, copolymer, or mixture thereof having a melting temperature of about 170° C. to about 260° C., preferably less than 260° C., and most preferably less than about 240° C. In a preferred embodiment, the thermoplastic resin should have a molecular weight in the range of 13,000 to 50,000 and/or a Young's modulus of more than 200 MPa at 23° C. By conventional definition, a thermoplastic is a synthetic resin that softens when heat is applied and regains its original properties upon cooling.

Such thermoplastic resins may be used singly or in combination and generally contain nitrogen, oxygen, halogen, sulfur or other groups capable of interacting with an aromatic functional groups such as halogen or acidic groups. Suitable thermoplastic resins include polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK), ethylene acetate copolymer resins (EVA) and mixtures thereof.

Suitable polyamides (nylons) comprise crystalline or resinous, high molecular weight solid polymers including homopolymers, copolymers, and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of polyamides include polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), poly(hexamethylene dodecanediamide (nylon-6,12), polyhexamethyleneisophthalamide (nylon-6, IP) and the condensation product of 11-amino-undecanoic acid (nylon-11). Commercially available polyamides may be advantageously used in the practice of this invention, with linear crystalline polyamides having a softening point or melting point between 170 and 260° C. being preferred.

Suitable polyesters which may be employed include the polymer reaction products of one or a mixture of aliphatic or aromatic polycarboxylic acids esters of anhydrides and one or a mixture of diols. Examples of satisfactory polyesters include poly (trans-1,4-cyclohexylene C2-6 alkane dicarboxylates such as poly(trans-1,4-cyclohexylene succinate) and poly (trans-1,4-cyclohexylene adipate); poly (cis or trans-1,4-cyclohexanedimethylene) alkanedicarboxylates such as poly(cis-1,4-cyclohexanedimethylene) oxlate and poly-(cis-1,4-cyclohexanedimethylene) succinate, poly (C2-4 alkylene terephthalates) such as polyethyleneterephthalate and polytetramethylene-terephthalate, poly (C2-4 alkylene isophthalates such as polyethyleneisophthalate and polytetramethylene-isophthalate and like materials. Preferred polyesters are derived from aromatic dicarboxylic acids such as naphthalenic or phthalic acids and C2 to C4 diols, such as polyethylene terephthalate and polybutylene terephthalate. Preferred polyesters will have a melting point in the range of 160° C. to 260° C.

Poly(phenylene ether) (PPE) resins which may be used in accordance with this invention are well known, commercially available materials produced by the oxidative coupling polymerization of alkyl substituted phenols. They are generally linear, amorphous polymers having a glass transition temperature in the range of 190° C. to 235° C.

In the dynamically vulcanized alloy, the thermoplastic resin is present in an amount ranging from about 10 to 98 wt % based on the alloy blend, and from about 20 to 95 wt % in another embodiment. In yet another embodiment, the thermoplastic resin is present in an amount ranging from 35 to 90 wt %. The amount of elastomer in the DVA is in an amount ranging from about 2 to 90 wt % based on the alloy blend, and from about 5 to 80 wt % in another embodiment. In any embodiment of the invention, the elastomer is present in an amount ranging from 10 to 65 wt %. In the invention, the thermoplastic resin is present in the alloy, relative to the amount of elastomer, in an amount in the range of 40 to 80 phr.

Ethylene Vinyl Alcohol Copolymer (EVOH)

In accordance with the invention, the DVA incorporates a low level of an ethylene copolymer resin having relatively high gas barrier properties. Examples of such ethylene copolymer resins include ethylene vinyl acetates, ethylene vinyl alcohols, as well as copolymers of ethylene with vinyl acetate or alkyl acrylates for example methyl acrylate and ethyl acrylate can be employed. In preferred embodiments, the ethylene copolymer resin is an ethylene vinyl alcohol (EVOH).

The EVOH in an embodiment has a polymerized ethylene component proportion of from 20 mol % to not more than 50 mol % and a degree of hydrolysis of 90% or more. In different embodiments, the EVOH has an ethylene content from 30 mol % to 50 mol %, an ethylene content from 30 mol % to 40 mol %, an ethylene content from 30 mol % to 34 mol %, an ethylene content from 34 mol % to 36 mol %, an ethylene content from 36 mol % to 40 mol %, an ethylene content from 40 mol % to 46 mol %, an ethylene content from 46 mol % to 50 mol %, or a mixture thereof, and the like.

In general, higher ethylene contents provide more flexibility, better processability and better compatibility with rubber components, whereas lower ethylene contents and/or a high degree of hydrolysis or saponification are beneficial to improved air barrier properties. In an embodiment, the EVOH is semicrystalline; a higher degree of crystallinity of the EVOH generally improves the air barrier property, i.e., reduces the air transmission rate. In one embodiment, the EVOH is subjected to a heat treatment in the TPE or DVA to increase crystallinity and improve air barrier characteristic. In one embodiment, the EVOH polymer by itself has an air transmission rate at 65% relative humidity and 20° C. by test method ISO 14663-2 annex C of less than 5 cc·20 $\mu m/m^2 \cdot day \cdot atm$, preferably less than 3 cc·0.20 $\mu m/m^2 \cdot day \cdot atm$, more preferably less than 2 cc·20 $\mu m/m^2 \cdot day \cdot atm$.

The EVOH can be produced, for example, by saponifying an ethylene-vinyl acetate copolymer (EVA) obtained by, for example, a radical polymerization of ethylene and vinyl acetate. In an embodiment, a product commercially available, for example, from EVAL Company of America, may be used alone or in any combinations, such as EVAL E105A (ethylene content 44 mol %), EVAL H171B (ethylene component ratio of 38 mol %), or EVAL L171B (ethylene component ratio of 26 mol %), for example.

The ethylene copolymer resin is present in an amount effective to improve the air barrier properties of the DVA. In any embodiment, the ethylene copolymer resin is present in an amount ranging from greater than about 5 phr, or 10 phr, or 15 phr to less than about 20 phr, or 30 phr, preferably in the range of about 5 to about 15 phr.

In any embodiment, the amount of ethylene copolymer resin, such as the above discussed EVOH, is present in an amount less than the primary thermoplastic resin that forms the continuous matrix in the DVA. The ratio of the ethylene copolymer resin to the primary thermoplastic resin, expressed in terms of phr of the primary elastomer, has a range of greater than about 0.0625 to less than about 0.375, or 0.5, or 0.75.

Nanofiller

To form the desired elastomeric nanocomposite, a nanofiller is incorporated into the elastomeric polymer. The nanofillers are also referred to as layered fillers due to the size and substructure of the fillers. Nanofillers have a maximum dimension in the range of from about 0.0001 $\mu m$ to about 100 $\mu m$. The other characteristic of a nanofiller is the high ratio of surface area to volume; this is in distinction to a fine grain carbon black that might have a very small maximum dimension, but which has a low ratio of surface area to volume per grain. This high ratio of surface area to volume provides the nanofiller with a sheet-like structure. Such materials are typically agglomerated, resulting in the layered filler.

In any embodiment of the invention, the layered filler may be a layered clay. The layered clay belongs to the general class of clay minerals with expanding crystal lattices commonly referred to as a "smectite" or "smectite-type clay." By way of example, this may include the dioctahedral smectites which consist of montmorillonite, beidellite, and nontronite, and the trioctahedral smectites, which includes saponite, hectorite, and sauconite. Also encompassed are synthetically prepared smectite-clays.

In yet other embodiments, the layered clay may comprise natural or synthetic phyllosilicates, such as montmorillonite, nontronite, beidellite, bentonite, volkonskoite, laponite, hectorite, saponite, sauconite, magadite, kenyaite, stevensite, and the like, as well as vermiculite, halloysite, aluminate oxides, hydrotalcite, and the like. Combinations of any of the previous embodiments are also contemplated. These clays typically have at least one naturally occurring cation, or first cation, such as potassium, calcium, or sodium, present within their galleries that are attracted to the net negative charge of the clay surface. For example, clays like montmorillonite may be mined with a naturally occurring cation such as sodium or calcium. The clays have a cationic exchange capacity (CEC) that relates to the ion exchange capacity of the clay, or the total quantity of positive charge that can be absorbed onto the clay surface, expressed in terms of positive charges per unit mass of colloidal particles. Some CEC values for exemplary clay materials are as follows: montmorillonite clays range from 70 to 150 meq/100 g; hallosite clays range from 40 to 50 meq/100 g; and kaolinite clays ranges from 1 to 10 meq/100 g; wherein the milliequivalent (meq) ratio is defined as the number of milliequivalents of the cation, per 100 grams of clay, 100% active basis.

The layered clays described above is modified by intercalation or exfoliation by at least one agent, modifier, or surfactant capable of undergoing ion exchange reactions with the anions present at the interlayer surfaces of the layered filler to render the clay more hydrophobic. The agents, modifiers, or surfactants are selected for their capability of undergoing ion exchange reactions with the anions present at the interlayer surfaces of the layered filler. Suitable compounds are cationic surfactants, preferably amines. The amines may be secondary or tertiary amines having the structure $N^+(R^1R^2R^3)$ wherein $R^1$ and $R^2$ are the same or different and are independently selected from $C_1$ to $C_{26}$ alkyls, $C_2$ to $C_{26}$ alkenes, and $C_3$ to $C_{26}$ aryls and $R^3$ may be hydrogen, a $C_1$ to $C_{26}$ alkyl, a $C_2$ to $C_{26}$ alkene, or a $C_3$ to $C_{26}$ aryl. In one embodiment, $R^1$ and $R^2$ are independently selected from $C_1$ to $C_8$ alkyls, $C_2$ to $C_8$ alkenes, and $C_3$ to $C_8$ aryls, and $R^3$ is selected from hydrogen, $C_9$ to $C_{26}$ alkyls, $C_9$ to $C_{26}$ alkenes, and $C_9$ to $C_{26}$ aryls. In another embodiment, $R^1$ and $R^2$ are independently selected from $C_1$ to $C_8$ alkyls, and $C_2$ to $C_8$ alkenes, $R^3$ is selected from hydrogen, $C_3$ to $C_{26}$ aryl substitution on a $C_1$ to $C_{26}$ alkyl. In another embodiment, $R^1$ is selected from $C_1$ to $C_8$ alkyls, $C_2$ to $C_8$ alkenes, and $C_3$ to $C_8$ aryls, $R^2$ is selected from $C_9$ to $C_{26}$ alkyls, $C_9$ to $C_{26}$ alkenes, and $C_9$ to $C_{26}$ aryls, and $R^3$ is selected from hydrogen, $C_1$ to $C_{26}$ alkyls, $C_2$ to $C_{26}$ alkenes, and $C_3$ to $C_{26}$ aryls.

Alternatively, the amine may be a quaternary amine, structurally described as follows:

$(R^1R^2R^3R^4)N^+$ wherein $R^1$, $R^2$, $R^3$, and $R^4$ are the same or different and are independently selected from $C_1$ to $C_{26}$ alkyls, $C_2$ to $C_{26}$ alkenes, and $C_3$ to $C_{26}$ aryls. In one embodiment, $R^1$ and $R^2$ are independently selected from $C_1$ to $C_8$ alkyls, $C_2$ to $C_8$ alkenes, and $C_3$ to $C_8$ aryls, and $R^3$ and $R^4$ are independently selected from $C_9$ to $C_{26}$ alkyls, $C_9$ to $C_{26}$ alkenes, and $C_9$ to $C_{26}$ aryls. In another embodiment, $R^1$ and $R^2$ are independently selected from $C_1$ to $C_8$ alkyls, and $C_2$ to $C_8$ alkenes, $R^3$ is selected from $C_9$ to $C_{26}$ alkyls, and $C_9$ to $C_{26}$ alkenes, and $R^4$ is a $C_3$ to $C_{26}$ aryl substitution on a $C_1$ to $C_{26}$ alkyl. In another embodiment, $R^1$ is selected from $C_1$ to $C_8$ alkyls, $C_2$ to $C_8$ alkenes, and $C_3$ to $C_8$ aryls, $R^2$ is selected from $C_9$ to $C_{26}$ alkyls, $C_9$ to $C_{26}$ alkenes, and $C_9$ to $C_{26}$ aryls, and $R^3$ and $R^4$ are the same or different and are independently selected from hydrogen, $C_1$ to $C_{26}$ alkyls, $C_2$ to $C_{26}$ alkenes, and $C_3$ to $C_{26}$ aryls.

Suitable quaternary ammoniums include, but are not limited to, dialkyl di-hydrogenated tallow ammonium, trialkyl hydrogenated tallow ammonium, dimethyl di-hydrogenated tallow ammonium, benzyl trialkyl ammonium, methyl benzyl dialkyl ammonium, methyl benzyl di-hydrogenated tallow ammonium, dimethyl benzyl hydrogenated tallow ammonium, and dibenzyl dialkyl ammonium.

As the modifying agent is added to the clay to undergo ion exchange reactions with the anions present at the interlayer surfaces of the layered filler, the modifying agent is conventionally added to the clay in amounts ranging from less than, equal, or greater than the CEC value for the particular clay. Preferably, the amount of agent will be equal to or greater than the CEC value. For the modifying agent, the milliequivalent ratio is defined as the number of milliequivalents of the ammonium compound, per 100 grams of clay, 100% active basis. The typical clays used in this invention have modifying agents present in amounts of 25 to 150 meq in one embodiment, and 70 to 125 meq in another embodiment. The preferred amount ratio will vary depending on the characteristics of the particular ammonium compound utilized and the desired exfoliation of the clay in the elastomer. In terms of weight ratios of the modified filler, the modifying agent will contain 15 to 60 wt % of the modified filler in one embodiment, and will contain 25 to 45 wt % in another embodiment.

Treatment of the filler with the modifying agents described above results in intercalation or "exfoliation" of the layered platelets as a consequence of a reduction of the ionic forces holding the layers together and introduction of molecules between the nanolayers which serve to space the layers at distances of greater than 4 Å, alternatively greater than 9 Å. This separation allows the layered filler to more readily sorb polymerizable monomer material and polymeric material between the layers and facilitates further delamination of the layers when the intercalate is shear mixed with matrix polymer material to provide a uniform dispersion of the exfoliated layers within the polymer matrix.

With most chemical reactions, there is often a small amount of one of the reactants left in excess after the desired reaction has occurred. Similarly, when modifying the layered filler with a modifying agent or surfactant, a small amount of the modifying agent is left after the treatment. While not wishing to be bound by theory, during further use and compounding of the modified filler, these remaining amounts of, or unassociated, modifying agent, or free amines may interact with the polymer backbone or any constituents connected to the polymer backbone, in particular any halogen, styrene, or benzyl functionality already connected to the polymer. In accordance with the present invention, either during or following treatment of the layered filler with the modifying agent, the nanofiller is treated such that the modified nanofiller is substantially free or absent of any unassociated modifying agents or amines. In particular, the filler is treated so as to be substantially free or absent of any nucleophilic amines, i.e., free or absent of any amines that have an unbonded electron pair.

Alternatively stated, an unassociated or free modifying agent or amine is a compound that has not bonded via the ionic forces on the surface of the filler layers. By "substantially free," the modified filler has not more than 1.5 wt %, or not more than 0.5 wt %, or not more than 0.01 wt % of unassociated modifying agent or amine in the modified nanofiller. The method of treatment of the nanofiller to eliminate any unassociated modifying agent or amines is not critical to the present invention—only that the nanofiller meet the desired criteria of substantially free or completely free of any unassociated modifying agent or amines.

The amount of exfoliated layered filler incorporated in the DVA generally will range from 1 phr or 2 phr or 3 phr or 4 phr or 5 phr to 6 or 7 or 8 or 10 or 15 phr.

Secondary Elastomer

In some embodiments, the DVA may further comprise a secondary elastomer. The secondary elastomer may be any elastomer, but preferably the secondary elastomer is a non-isobutylene-containing elastomer. An example of a preferred secondary elastomer is a maleic anhydride-modified copolymer. Preferably, the secondary elastomer is a copolymer comprising maleic anhydride and ester functionalities such as maleic anhydride-modified ethylene-ethyl acrylate.

The amount of the secondary elastomer in the DVA may be in the range of from about 2 wt % to about 45 wt %. If the DVA comprises at least one elastomer and a secondary elastomer, the total amount of both the elastomer and secondary elastomer is preferably in the range of from about 2 wt % to about 90 wt %.

This secondary elastomer may be cured along with the primary isoolefin based elastomer or it may be selected to remain uncured and act as a compatibilizer as discussed below.

Other DVA Components

Other materials may be blended into the DVA to assist with preparation of the DVA or to provide desired physical properties to the DVA. Such additional materials include, but are not limited to, curatives, stabilizers, compatibilizers, reactive plasticizers, non-reactive plasticizers, extenders and polyamide oligomers or low molecular weight polyamide as described in U.S. Pat. No. 8,021,730 B2.

Curing of the primary elastomer is generally accomplished by the incorporation of the curing agents and optionally accelerators, with the overall mixture of any such components referred to as the cure system or cure package. Suitable curing components include sulfur, metal oxides, organometallic compounds, radical initiators. Common curatives include ZnO, CaO, MgO, Al2O3, CrO3, FeO, Fe2O3, and NiO. These metal oxides can be used alone or in conjunction with metal stearate complexes (e.g., the stearate salts of Zn, Ca, Mg, and Al), or with stearic acid or other organic acids and either a sulfur compound or an alkyl or aryl peroxide compound or diazo free radical initiators. If peroxides are used, peroxide co-agent commonly used in the art may be employed. The use of peroxide curative may be avoided if the thermoplastic resin is one such that the presence of peroxide would cause the thermoplastic resin to cross-link.

As noted, accelerants (also known as accelerators) may be added with the curative to form a cure package. Suitable curative accelerators include amines, guanidines, thioureas, thiazoles, thiurams, sulfenamides, sulfenimides, thiocarbamates, xanthates, and the like. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR90), N-tertiarybutyl-2-benzothiazole sulfenamide (TBBS), N-(1,3-dimethylbutyl)-N'-phenyl-p-phenylenediamine (6PPD), and N-oxydiethylene thiocarbamyl-N-oxydiethylene sulfonamide (OTOS), zinc 2-ethyl hexanoate (ZEH), N,N'-diethyl thiourea.

In any embodiment of the invention, at least one curing agent is typically present at about 0.1 to about 15 phr; alternatively at about 1.0 to about 10 phr, or at about 1.0 to 6.0 phr, or at about 1.0 to 4.0 phr, or at about 1.0 to 3.0 phr, or at about 1.0 to 2.5 phr, or at about 2.0 to 5.0 phr. If only a single curing agent is used, it is preferably a metal oxide such as zinc oxide.

Minimizing the viscosity differential between the elastomer and the thermoplastic resin components during mixing and/or processing enhances uniform mixing and fine blend morphology that significantly enhance good blend mechanical as well as desired permeability properties. However, as a consequence of the flow activation and shear thinning characteristic inherent in elastomeric polymers, reduced viscosity values of the elastomeric polymers at the elevated temperatures and shear rates encountered during mixing are much more pronounced than the reductions in viscosity of the thermoplastic component with which the elastomer is blended. It is desired to reduce this viscosity difference between the materials to achieve a DVA with acceptable elastomeric dispersion sizes.

Components previously used to compatibilize the viscosity between the elastomer and thermoplastic components include low molecular weight polyamides, maleic anhydride grafted polymers having a molecular weight on the order of 10,000 or greater, methacrylate copolymers, tertiary amines and secondary diamines. One common group of compatibilizers are maleic anhydride-grafted ethylene-ethyl acrylate copolymers (a solid rubbery material available from Mitsui-DuPont as AR-201 having a melt flow rate of 7 g/10 min measured per JIS K6710), as well as butylbenzylsulfonamide and polyisobutylene succinic anhydride; the use of such additives are further discussed in pending U.S. application Ser. No. 12/548,797, filed Aug. 29, 2009. These compounds may act to increase the 'effective' amount of thermoplastic material in the elastomeric/thermoplastic compound. The amount of additive is selected to achieve the desired viscosity comparison without negatively affecting the characteristics of the DVA. If too much additive is present, impermeability may be decreased and the excess may have to be removed during post-processing. If not enough compatibilizer is present, the elastomer may not invert phases to become the dispersed phase in the thermoplastic resin matrix.

Both reactive and non-reactive plasticizers can function as compatibilizers due to the nature of a plasticizer. Plasticizers for thermoplastics are generally defined as a compound added to polymeric materials to improve flexibility, extensibility, and processability. Known and conventional thermoplastic plasticizers are supplied in the form of low to high viscosity liquid and may be functionalized. Many different plasticizers are known in the thermoplastic resin art as plasticizers have different compatibilities with each type of thermoplastic resin and have different effects on the properties of the thermoplastic resin. Known thermoplastic plasticizers include different types of esters, hydrocarbons (aliphatic, naphthenic, and aromatic), polyesters, and polycondensates; see Handbook of Thermoplastic Elastomers, Jiri George Drobny, p. 23 (William Andrew Publishing, 2007). For polyamides, known non-reactive plasticizers include hydrocarbons functionalized by tertiary amines, secondary diamines, or sulfonamides. One particularly well known compound is butylbenzylsulfonamide (BBSA).

Both maleic and succinic anhydrides functionalized oligomers are also useful as reactive plasticizers. The anhydride functionalized oligomer (AFO) may be prepared by thermal or chloro methods known in the art of reacting an alkyl, aryl, or olefin oligomer with anhydride, preferably maleic anhydride. The oligomer, including copolymers of lower olefins, before being reacted with the anhydride, has a molecular weight in the range of about 500 to 5000, or 500 to 2500, or 750 to 2500, or 500 to 1500. The oligomer may also have a molecular weight in the ranges of 1000 to 5000, 800 to 2500, or 750 to 1250. Specific examples of succinic anhydrides include poly-isobutylene succinic anhydride, poly-butene succinic anhydride, n-octenyl succinic anhydride, n-hexenyl succinic anhydride, and dodocenyl succinic anhydride. The most preferred anhydride functionalized oligomers are those derived from polyisobutene and are commonly known as polyisobutylene succinic anhydride or polyisobutene succinic anhydride (PIBSA). The PIBSA may be made by cationic polymerization of isobutene with boron trifluoride as catalyst. In the course of the polymerization, high concentrations of $\alpha$-olefins are formed during the transfer reaction and as a result the polymerization product has a high proportion of terminal double bonds ($\alpha$-olefin). They are normally clear to amber viscous liquids and are specially optimized during the post polymerization maleation reaction to have a low bismaleation.

The anhydride level of the AFO may vary and a preferred range is about 1% to about 30 wt % with a preferred range of 5 to 25 wt % and a more preferred range of 7 to 17 wt % and a most preferred range of 9 to 15 wt %.

DVA Preparation

In an embodiment, prior to preparation of the DVA, the nanofiller is first incorporated into the primary elastomer. This can be done by any previously known methods such as melt blending, solution blending, or emulsion blending.

Melt blending of the nanofiller and elastomer is carried out by combining the polymer components and the clay in the form of an intercalate in any suitable mixing device such as a Banbury™ mixer, Brabender™ mixer or preferably a mixer/extruder and mixing at temperatures in the range of 120° C. up to 300° C. under conditions of shear sufficient to allow the clay intercalate to exfoliate and become uniformly dispersed within the polymer to form a nanocomposite.

For solution blending, the filler is blended into the elastomer by contacting Solution A comprising a hydrocarbon solvent and at least one layered nanofiller slurried therein with Solution B comprising a solvent and at least one elastomer (Solution B is commonly referred to as a cement due to dissolving of the elastomer in the solvent), and removing the solvents from the contact product of Solution A and Solution B to form a nanocomposite. Suitable solvents include hydrocarbons such as alkanes, including $C_4$ to $C_{22}$ linear, cyclic, branched alkanes, alkenes, aromatics, and mixtures thereof. During solvent mixing, the solution created by the combination of Solution A and Solution B contains 40 to 99 wt % of solvent, with the remainder being the dissolved elastomer and the slurried nanofiller.

For emulsion blending, an aqueous slurry of nanofiller is mixed with a polymer dissolved in a solvent (i.e. a polymer cement). The mixing should be sufficiently vigorous to form emulsions or micro-emulsions and permit exfoliation of the layered filler. In some embodiments, the emulsions can be formed as an aqueous solution or suspension in an organic solution. The solvent and water are removed to recover the nanocomposite.

To obtain the desired emulsion, a surfactant is typically used. The surfactant concentration is sufficient to allow the formation of a relatively stable emulsion. Preferably, the amount of surfactant employed is at least 0.001 wt % of the total emulsion. The selection of the surfactant in the present invention must be such that it i) does not interfere with the later grafting of the primary elastomer and the thermoplastic resin during formation of the DVA or i) undesirably alter the relative viscosities of the nanocomposite and thermoplastic resin during formation of the DVA.

The difference between solution blending and emulsion blending is the inclusion of water in the emulsion blending and, conversely, the absence of water in the solution blending. When using either of these solvent based methods of incorporation of the filler into the elastomer, the resulting nanocomposite should be dried to remove as much solvent as possible so that residual solvent does not affect the relative viscosities of the elastomer and thermoplastic resin during preparation of the DVA.

The above methods of incorporating a nanofiller into an elastomer are disclosed in further detail in US Patent Application 2011-0265927.

After the elastomeric nanocomposite has been prepared, the DVA is prepared. For thin films, of the type to be used for preparing tire inner liners, the morphology of the DVA is critical in obtaining the desired properties. Uniform distribution of submicron or nanometer sized elastomer particles in a continuous thermoplastic matrix is important to achieve optimum properties. Sub-inclusions of the thermoplastic inside the rubber particles may also be present; but for any sub-inclusions in the elastomer, the thermoplastic resin will preferably not be discontinuous in the DVA. The morphology of the DVA is dependent upon the mixing conditions, including temperature, order of introducing ingredients, residence time, as well as shear rates; it has been determined that using any randomly selected or on-hand variety of mixers and extruders may not provide the necessary DVA morphology.

In one embodiment, the DVA is prepared by jointly feeding into an initial feed throat of an extruder the elastomeric nanocomposite and all or part of the primary thermoplastic resin to begin mixing and shearing of the elastomeric nanocomposite and thermoplastic resin. As the material travels through the extruder, the ethylene copolymer resin is added at a feed port distanced from the initial feed throat. These components are mixed under conditions such that the two resins are melted and the elastomeric nanocomposite becomes pliable and the elastomer component of the elastomeric nanocomposite and the primary thermoplastic resin begin to graft to each other; however, the conditions are insufficient to initiate curing or vulcanization of the elastomer. If needed, any remaining primary thermoplastic resin is added after grafting has initiated. In an preferred embodiment, only after grafting of the primary thermoplastic resin and elastomer has progressed, are curatives or a cure package fed into the extruder at a downstream location. Mixing of the extruder contents continues until the elastomeric nanocomposite is fully dispersed as discrete particles in a continuous domain of the thermoplastic resin.

More details of this mixing method, as well as shear rates, mixing conditions, and extruder port locations, are disclosed in Assignees PCT Patent Application PCT/US2013/065001, filed Oct. 15, 2013, having a priority claim to U.S. Provisional Application 61/740,114, filed Dec. 20, 2012.

Specific Embodiments

The invention, accordingly, provides the following embodiments:

Paragraph A: A dynamically vulcanized alloy, the alloy comprising: at least one elastomer comprising $C_4$ to $C_7$ isomonoolefin derived units; at least one thermoplastic resin having a melting temperature in the range of 170° C. to 260° C.; a nanofiller; and 5 to 30 phr of an ethylene copolymer resin, wherein the elastomer is present as a dispersed phase of small particles in a continuous phase of the thermoplastic resin.

Paragraph B: The alloy as claimed in Paragraph A, wherein said nanofiller comprises a layered filler and an amine modifier.

Paragraph C: The alloy as claimed in Paragraph B, wherein the amine modifier has the following structure:

wherein $R^1$ is selected from $C_1$ to $C_8$ alkyls, $C_2$ to $C_8$ alkenes, and $C_3$ to $C_8$ aryls, wherein $R^2$ is selected from $C_9$ to $C_{26}$ alkyls, $C_9$ to $C_{26}$ alkenes, and $C_9$ to $C_{26}$ aryls, and wherein $R^3$ and $R^4$ are the same or different and are independently selected from hydrogen, $C_1$ to $C_{26}$ alkyls, $C_2$ to $C_{26}$ alkenes, and $C_3$ to $C_{26}$ aryls.

Paragraph D: The alloy as claimed in Paragraph B, wherein the nanofiller is substantially free or absent of any unassociated modifying agents or amines.

Paragraph E: The alloy as claimed in Paragraph B, wherein the amine modifier is selected from the group consisting of tetra alkyl ammonium, trialkyl aryl ammonium, and dialkyl di-aryl ammonium.

Paragraph F: The alloy as claimed in Paragraph A and optionally Paragraph B to D, wherein the layered filler is at least one silicate and is selected from at least one of montmorillonite, nontronite, beidellite, bentonite, volkonskoite, laponite, hectorite, saponite, sauconite, magadite, kenyaite, stevensite, vermiculite, halloysite, aluminate oxides, and hydrotalcite.

Paragraph G: The alloy as claimed in Paragraph F, wherein the layered filler is montmorillonite.

Paragraph H: The alloy as claimed in Paragraph A and any one or any combination of Paragraphs B to G, wherein the ethylene copolymer resin has not more than 50 mol % of ethylene.

Paragraph I: The alloy as claimed in Paragraph A and any one or any combination of Paragraphs B to H, wherein the ethylene copolymer resin is ethylene vinyl alcohol.

Paragraph J: The alloy as claimed in Paragraph A and any one or any combination of Paragraphs B to I, wherein the ratio of the ethylene copolymer resin to the thermoplastic resin is in the range of 0.0625 to 0.75.

Paragraph K: The alloy as claimed in Paragraph A and any one or any combination of Paragraphs B to J, wherein the nanofiller is in the range of 4 to 15 phr.

Paragraph L: The alloy as claimed in Paragraph A and any one or any combination of Paragraphs B to K, wherein the alloy is further comprised of a secondary elastomer.

Paragraph M: The alloy as claimed in Paragraph L, wherein the secondary elastomer is maleic anhydride-modified copolymer.

Paragraph N: The alloy as claimed in Paragraph A and any one or any combination of Paragraphs B to M, wherein the alloy is further comprised of at least one compatibilizer or viscosity modifier.

Paragraph O: The alloy as claimed in Paragraph A and any one or any combination of Paragraphs B to N, wherein the thermoplastic resin is selected from at least one of polyamides, polyimides, polycarbonates, polyesters, polysulfonates, polyactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, ethylene acetate copolymer resins, and mixtures thereof.

Paragraph P: The alloy as claimed in Paragraph O, wherein the thermoplastic resin is a polyamide selected from the group consisting of nylon-6, nylon-12, nylon-6,6, nylon-6,9, nylon-6,10, nylon-6,12, nylon 6,66 copolymer, nylon-11, and mixtures thereof.

Paragraph Q: The alloy as claimed in Paragraph A and any one or any combination of Paragraphs B to P, wherein the elastomer is an isobutylene derived elastomer.

Paragraph R: The alloy as claimed in Paragraph Q, wherein the elastomer is a copolymer of an isobutylene and an alkylstyrene.

Paragraph S: The alloy as claimed in Paragraph A and any one or any combination of Paragraphs B to R, wherein the elastomer is present in the alloy in an amount in the range of from about 2 to about 90 wt % based on the total alloy blend weight or the thermoplastic resin is present in the alloy in an amount in the range of from 10 to 98 wt % based on the total alloy blend weight.

Paragraph T: The alloy as claimed in Paragraph A and any one or any combination of Paragraphs B to S, wherein the thermoplastic resin is present in the alloy in an amount of 40 to 80 phr.

Paragraph U: The alloy as claimed in Paragraph A and any one or any combination of Paragraphs B to T, wherein the elastomer is an isobutylene-paramethylstyrene copolymer.

Paragraph V: The alloy as claimed in Paragraph U, wherein the isobutylene-paramethylstyrene copolymer is brominated.

Paragraph W: An article made from the dynamically vulcanized alloy as set forth in Paragraph A and any one or any combination of Paragraphs B to V, wherein the article is a tire innerliner or a tire bladder or is incorporated as a layer into a tire, a bladder, a hose, a belt, pneumatic spring, or vehicle body mount.

Paragraph X: A film formed from the dynamically vulcanized alloy as set forth in Paragraph A and any one or any combination of Paragraphs B to W.

Paragraph Y: The film as claimed in Paragraph X, wherein the film has a permeability coefficient of less than or equal to 0.16 cc-mm/mg-day-mmHg.

EXAMPLES

The inventive DVAs will now be further described with reference to the following non-limiting examples. When possible, standard ASTM tests were used to determine the DVA's physical properties.

Figure 1:
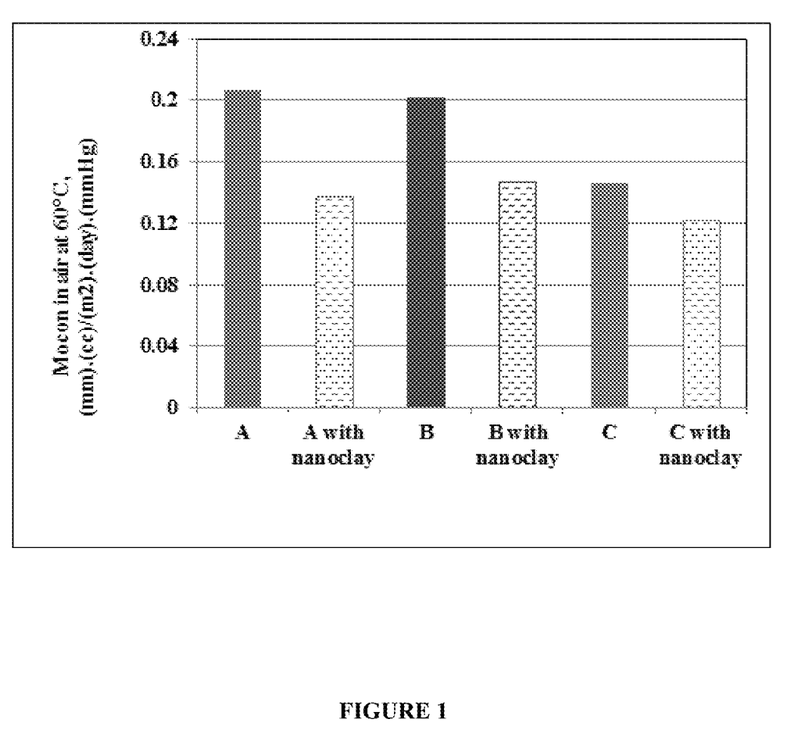
FIG. 1 shows the air permeability of various TPVs and TPVs with a nanofiller.

Air permeability, also referred to herein as "permeability", "Mocon", or "Mocon permeability" was measured using a MOCON OxTran Model 2/61 operating under the principle of dynamic measurement of air transport through a thin film. The units of measure are cc-mm/m2-day-mm-HgGenerally, the method is as follows: flat film or rubber samples are dried for 2 hours at 150° C. and then clamped into diffusion cells which are purged of residual oxygen using an oxygen free carrier gas. The carrier gas is routed to a sensor until a stable zero value is established. Pure oxygen or air is then introduced into the outside of the chamber of the diffusion cells at a temperature of 60° C. The air diffusing through the film to the inside chamber is conveyed to a sensor which measures the air diffusion rate. Permeability is measured in cc-mm/m2-day-mmHg at 60° C. A listing of various components used in the DVA samples is provided in Table 1.

introduction of expandable smectite-type clay (i.e., a montrmorillonite treated clay with surfactant) in the elastomer results in improved barrier properties of the resulting composition.

Figure 2:
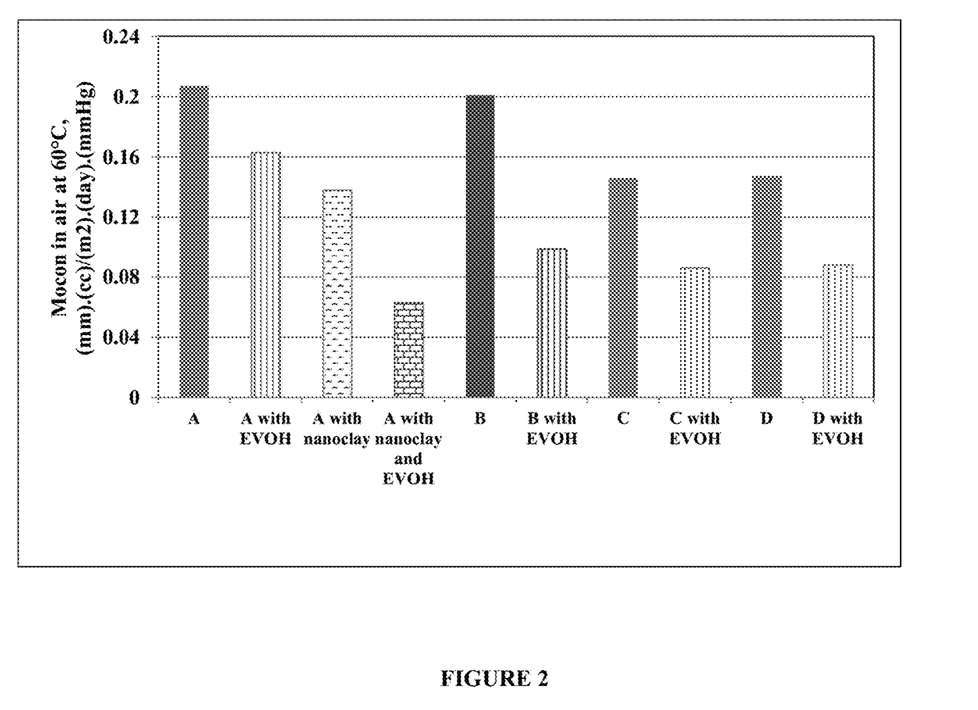
FIG. 2 shows the air permeability of various TPVs and TPVs with EVOH and/or nanofiller.

FIG. 2 shows the air permeability of DVAs A to D with nanofiller and/or EVOH. The addition of 10 phr of RXG-

TABLE 1

| Material | Brief Description | Commercial Source |
|---|---|---|
| BIMSM 1 | 10 wt % PMS, 0.85 mol % BrPMS, Mooney viscosity of 31 ± 5 MU (1 + 8, 125° C.) | ExxonMobil Chemical |
| BIMSM 2 | 5 wt % PMS, 0.75 mol % BrPMS, Mooney viscosity of 45 ± 5 MU (1 + 8, 125° C.) | ExxonMobil Chemical |
| BIMSM 3 | 7.5 wt % PMS, 1.2 mol % BrPMS, Mooney viscosity of 45 ± 5 MU (1 + 8, 125° C.) | ExxonMobil Chemical |
| BIMSM 4 | 10 wt % PMS, 0.85 mol % BrPMS, Mooney viscosity of 36 ± 5 MU (1 + 8, 125° C.) | ExxonMobil Chemical |
| ZnO | Zinc Oxide | Kadox 911 Zinc Corp. |
| Talc | | SG 2000; Nippon |
| Polyamide 1 | PA6/66 copolymer | C3301; BASF |
| Polyamide 2 | PA6 homopolymer | Ultramid B27; BASF |
| Polyamide 3 | PA6/12 copolymer | |
| Polyamide 4 | PA6 with 16 phr nanofiller | Nanocor |
| EVOH | | |
| Nanofiller | Acid treated montmorillonite clay with di-methyl di-tallow alkyl ammonia | RXG-7083 (acid treated Cloisite 20A); Southern Clay |
| Stabilizer Package | 0.22 phr 0.09 phr 0.02 Copper Iodide | Irganox 1098; Ciba Tinuvin 622LD; Ciba Sigma-Aldrich |
| PIBSA | Polyisobutylene succinic anhydride, MW before anhydride reaction = 950-1000, viscosity at 100° C. = 459 cSt, saponification # = 100 mg KOH/gm | PIBSA 950 from Texas Petrochemicals LP Or Dovermulse H1000 from Dover Chemical Corp. |

Comparative DVA samples A, B, and C were prepared to show the characteristics of the DVAs when the DVA excludes both an ethylene copolymer resin and nanofiller. The compositions of the comparative samples were identical and are provided in Table 2 below, with the amount of each component expressed in terms of parts per hundred rubber. In these samples, in terms of wt % of the DVA, the BIMSM elastomer is present at 52.78 wt % and the primary thermoplastic resin, the polyamide copolymer, is present in an amount of 31.14 wt %.

7083 nanofiller and/or 7.9 phr of EVOH favorably reduces the Mocon air permeability, in comparison to DVAs without EVOH and/or nanofiller. Specifically, DVAs with nanofiller result in about a 33% improvement in Mocon and compositions with EVOH result in about a 21% improvement in Mocon. DVA A indicates that the addition of nanofiller in combination with EVOH unexpectedly reduces the Mocon permeability of the composition, in comparison to DVA A with only EVOH or with only nanofiller. Specifically, DVAs with both nanofiller and EVOH result in about a 70%

TABLE 2

| | A | B | C | D | E | F | G | H | I | J |
|---|---|---|---|---|---|---|---|---|---|---|
| BIMSM 1 | 100 | — | — | — | — | — | — | — | — | — |
| BIMSM 2 | — | 100 | — | — | 100 | — | — | 100 | — | — |
| BIMSM 3 | — | — | 100 | — | — | 100 | — | — | 100 | — |
| BIMSM 4 | — | — | — | 100 | — | — | 100 | — | — | 100 |
| Polyamide 1 | 59 | 59 | 59 | 59 | 59 | 59 | 59 | | | |
| Polyamide 2 | | | | | 15 | 15 | 15 | 15 | 15 | 15 |
| Polyamide 3 | | | | | | | | 59 | 59 | 59 |
| Zinc oxide | 2 | 2 | 2 | 2 | 2 | 2 | 2 | 2 | 2 | 2 |
| Talc | 2 | 2 | 2 | 2 | 2 | 2 | 2 | 2 | 2 | 2 |
| PIBSA 950 | 10 | 10 | 10 | 10 | 10 | 10 | 10 | 10 | 10 | 10 |
| Stabilizer Package | 0.48 | 0.48 | 0.48 | 0.48 | 0.48 | 0.48 | 0.48 | 0.48 | 0.48 | 0.48 |

The oxygen permeability of DVAs A to C was tested and is reported in FIG. 1 as "A", "B", and "C", respectively. To test the effect of adding nanofiller to the DVA compositions, the nanofiller RXG-7083 was added to each of the DVAs of Table 2 such that the amount of BIMSM/nanofiller was 90/10 phr. FIG. 1 also shows the air permeability of DVAs A to C with nanofiller. As all three compositions indicate, the addition of nanofiller favorably reduces the Mocon air permeability. Specifically, DVAs with nanofiller had about a 25% improvement in Mocon. FIG. 1 indicates that the improvement in Mocon. FIG. 2 indicates that the target composition air permeability can be achieved with the addition of a combination of EVOH and nanofiller.

Figure 3:
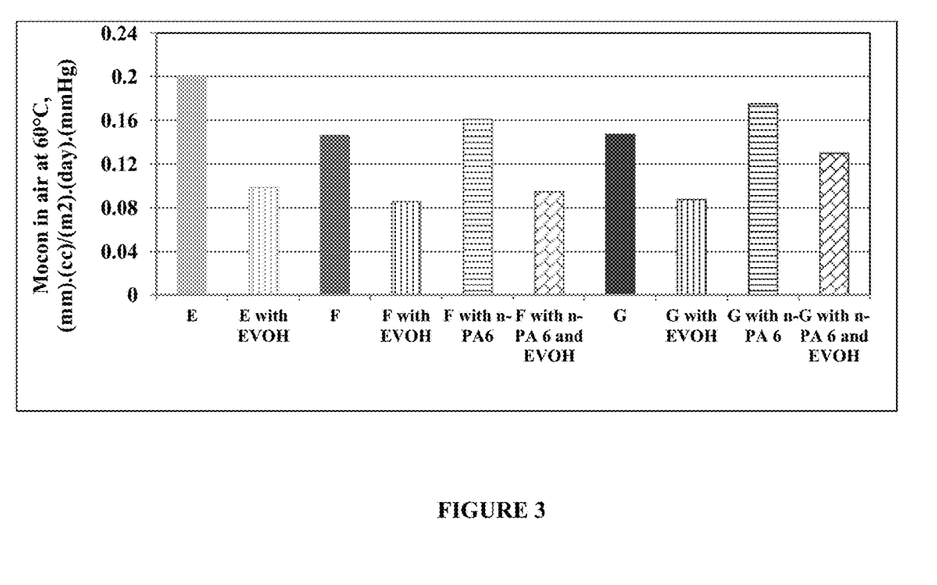
FIG. 3 shows the air permeability of various TPVs based on nylon-6,66 and TPVs with EVOH and/or a nano-polyamide.

FIG. 3 shows the air permeability of DVAs E to G (based on Polyamide 1 and Polyamide 2) with EVOH and/or Polyamide 4. The addition of 7.9 phr of EVOH and/or 16 phr of Polyamide 4 in place of Polyamide 2 favorably reduces the Mocon air permeability, in comparison to DVAs without EVOH and/or Polyamide 4. DVAs E and G indicate that the addition of EVOH in combination with Polyamide 4 reduces Mocon to about the same level as DVAs E and G with only EVOH but to a lower air permeability level as DVAs E and G with Polyamide 4.

Figure 4:
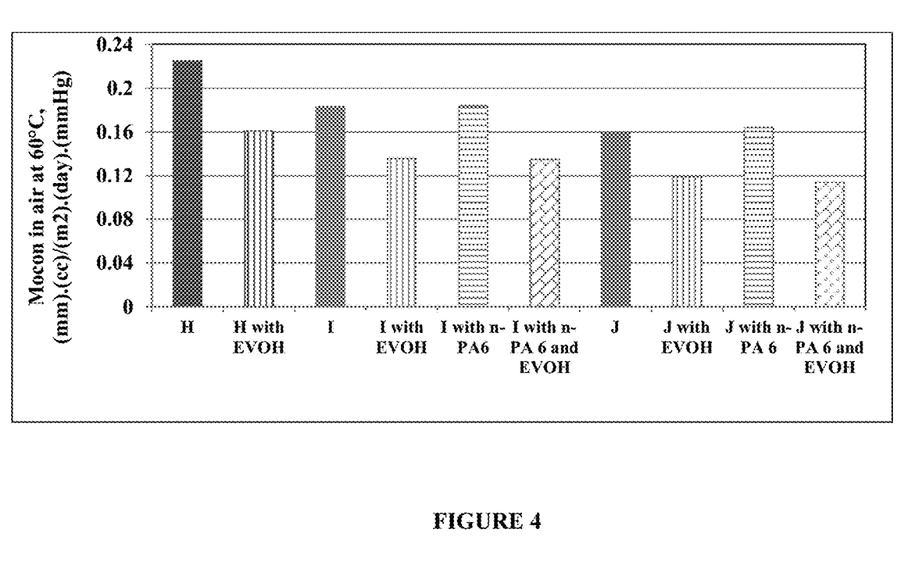
FIG. 4 shows the air permeability of various TPVs based on nylon-6,12 and TPVs with EVOH and/or a nano-polyamide.

FIG. 4 shows the air permeability of DVAs H to J (based on Polyamide 3 and Polyamide 2) with EVOH and/or Polyamide 4. The addition of 7.9 phr of EVOH and/or 16 phr of Polyamide 4 in place of Polyamide 2 favorably reduces the Mocon air permeability, in comparison to DVAs without EVOH and/or Polyamide 4. DVAs H and J indicate that the addition of EVOH in combination with Polyamide 4 reduces Mocon to about the same level as DVAs H and J with only EVOH but to a lower air permeability level as DVAs H and J with Polyamide 4. FIGS. 3 and 4 indicate that DVAs based on Polyamide 1 (such as DVAs E to G) have favorably lower Mocon than DVAs based on Polyamide 3 (such as DVAs H to J).

While the above specification and examples are specific to low permeability elastomers as the principal/primary elastomer, as the described process is directed to a solution for creating DVAs of a reactive mixture wherein interfacial grafting occurs, the process may be used with other types of elastomers and thermoplastics (and secondary materials) wherein the mixture is a reactive mixture (exclusive of any cross-linking reaction due to added curatives).

INDUSTRIAL APPLICABILITY

The inventive compositions can be used to make any number of articles. In one embodiment, the article is selected from tire curing bladders, tire innerliners, tire innertubes, and air sleeves. In another embodiment, the article is a hose or a hose component in multilayer hoses, such as those that contain polyamide as one of the component layers. Other useful goods that can be made using compositions of the invention include air spring bladders, seals, molded goods, cable housing, and other articles disclosed in THE VANDERBILT RUBBER HANDBOOK, PP. 637-772 (Ohm, ed., R.T. Vanderbilt Company, Inc. 1990).

All priority documents, patents, publications, and patent applications, test procedures (such as ASTM methods), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. A dynamically vulcanized alloy, the alloy comprising:
   a. at least one elastomer comprising $C_4$ to $C_7$ isomonoolefin derived units;
   b. at least one thermoplastic resin having a melting temperature in the range of 170° C. to 260° C.;
   c. a nanofiller; and
   d. 5 to 30 phr of an ethylene copolymer resin,
   wherein the elastomer is present as a dispersed phase of small particles in a continuous phase of the thermoplastic resin.

2. The alloy as claimed in claim 1, wherein said nanofiller comprises a layered filler and an amine modifier.

3. The alloy as claimed in claim 2, wherein the amine modifier has the following structure:

wherein $R^1$ is selected from $C_1$ to $C_8$ alkyls, $C_2$ to $C_8$ alkenyls, and $C_3$ to $C_8$ aryls,
wherein $R^2$ is selected from $C_9$ to $C_{26}$ alkyls, $C_9$ to $C_{26}$ alkenyls, and $C_9$ to $C_{26}$ aryls, and wherein $R^3$ and $R^4$ are the same or different and are independently selected from hydrogen, $C_1$ to $C_{26}$ alkyls, $C_2$ to $C_{26}$ alkenyls, and $C_3$ to $C_{26}$ aryls.

4. The alloy as claimed in claim 2, wherein the amine modifier is selected from the group consisting of tetra alkyl ammonium, trialkyl aryl ammonium, and di-alkyl di-aryl ammonium.

5. The alloy as claimed in claim 1, wherein the layered filler is at least one silicate and is selected from at least one of montmorillonite, nontronite, beidellite, bentonite, volkonskoite, laponite, hectorite, saponite, sauconite, magadite, kenyaite, stevensite, vermiculite, halloysite, aluminate oxides, and hydrotalcite.

6. The alloy as claimed in claim 1, wherein the ethylene copolymer resin has not more than 50 mol % of ethylene.

7. The alloy as claimed in claim 1, wherein the ethylene copolymer resin is ethylene vinyl alcohol copolymer.

8. The alloy as claimed in claim 1, wherein the ratio of the ethylene copolymer resin to the thermoplastic resin, expressed in terms of phr of the elastomer, is in the range of 0.0625 to 0.75.

9. The alloy as claimed in claim 1, wherein the nanofiller is in the range of 4 to 15 phr.

10. The alloy as claimed in claim 1, wherein the thermoplastic resin is selected from at least one of polyamides, polyimides, polycarbonates, polyesters, polysulfonates, polylactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, ethylene acetate copolymer resins, and mixtures thereof.

11. The alloy as claimed in claim 1, wherein the thermoplastic resin is a polyamide selected from the group consisting of nylon-6, nylon-12, nylon-6,6, nylon-6,9, nylon-6,10, nylon-6,12, nylon-6,66 copolymer, nylon-11, and mixtures thereof.

12. The alloy as claimed in claim 1, wherein the elastomer is an isobutylene derived elastomer.

13. The alloy as claimed in claim 1, wherein the elastomer is a copolymer of an isobutylene and an alkylstyrene.

14. The alloy as claimed in claim 1, wherein the thermoplastic resin is present in the alloy in an amount of 40 to 80 phr.

15. An article made from the dynamically vulcanized alloy as set forth in claim 1, wherein the article is a tire innerliner or a tire bladder or is incorporated as a layer into a tire, a bladder, a hose, a belt, a pneumatic spring, or a vehicle body mount.

16. A film formed from the dynamically vulcanized alloy as set forth in claim 1.

17. The film as claimed in claim 16, wherein the film has a permeability coefficient of less than or equal to 0.16 cc-mm/m$^2$-day-mmHg.

* * * * *